Nov. 20, 1928.
C. F. MÖLLER
1,692,343
POTATO DIGGER AND SEPARATOR
Filed March 11, 1925    3 Sheets-Sheet 1
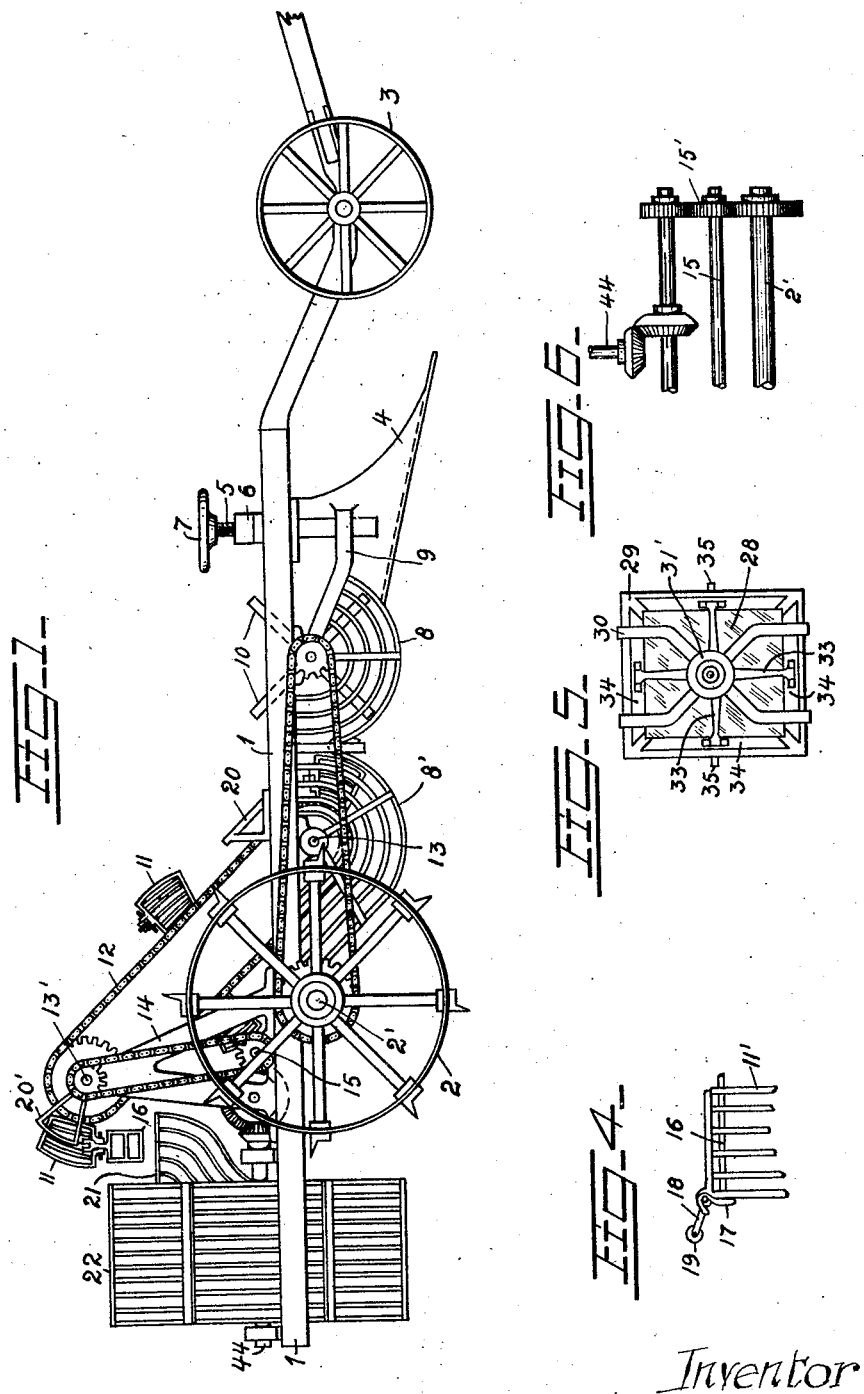
Inventor
Carl Fredrik Möller
per
Attorney.

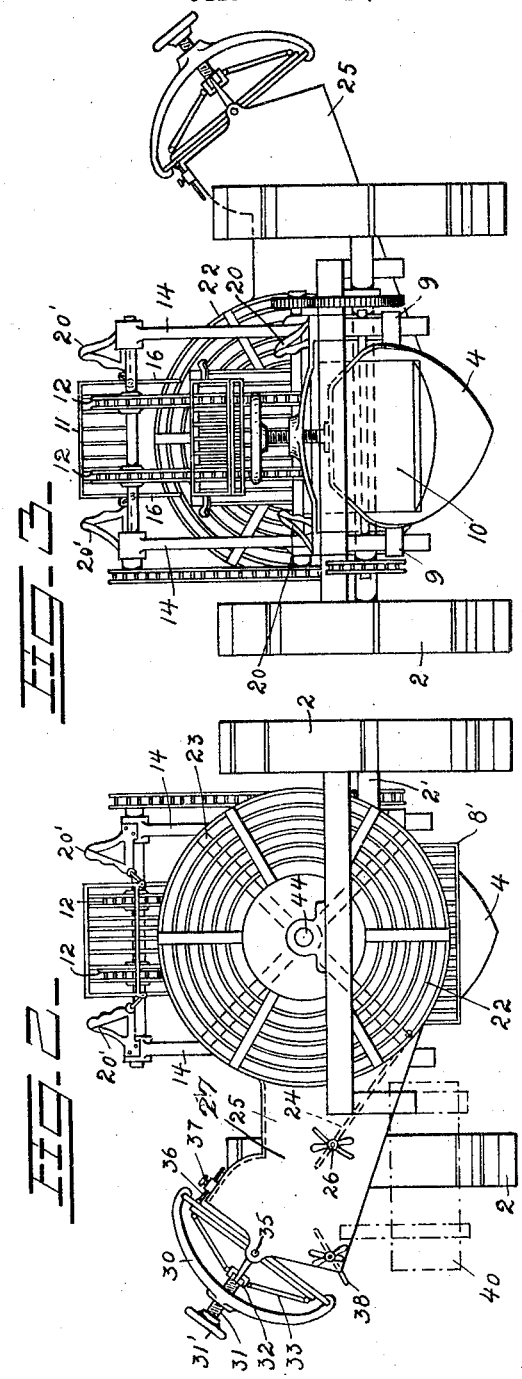

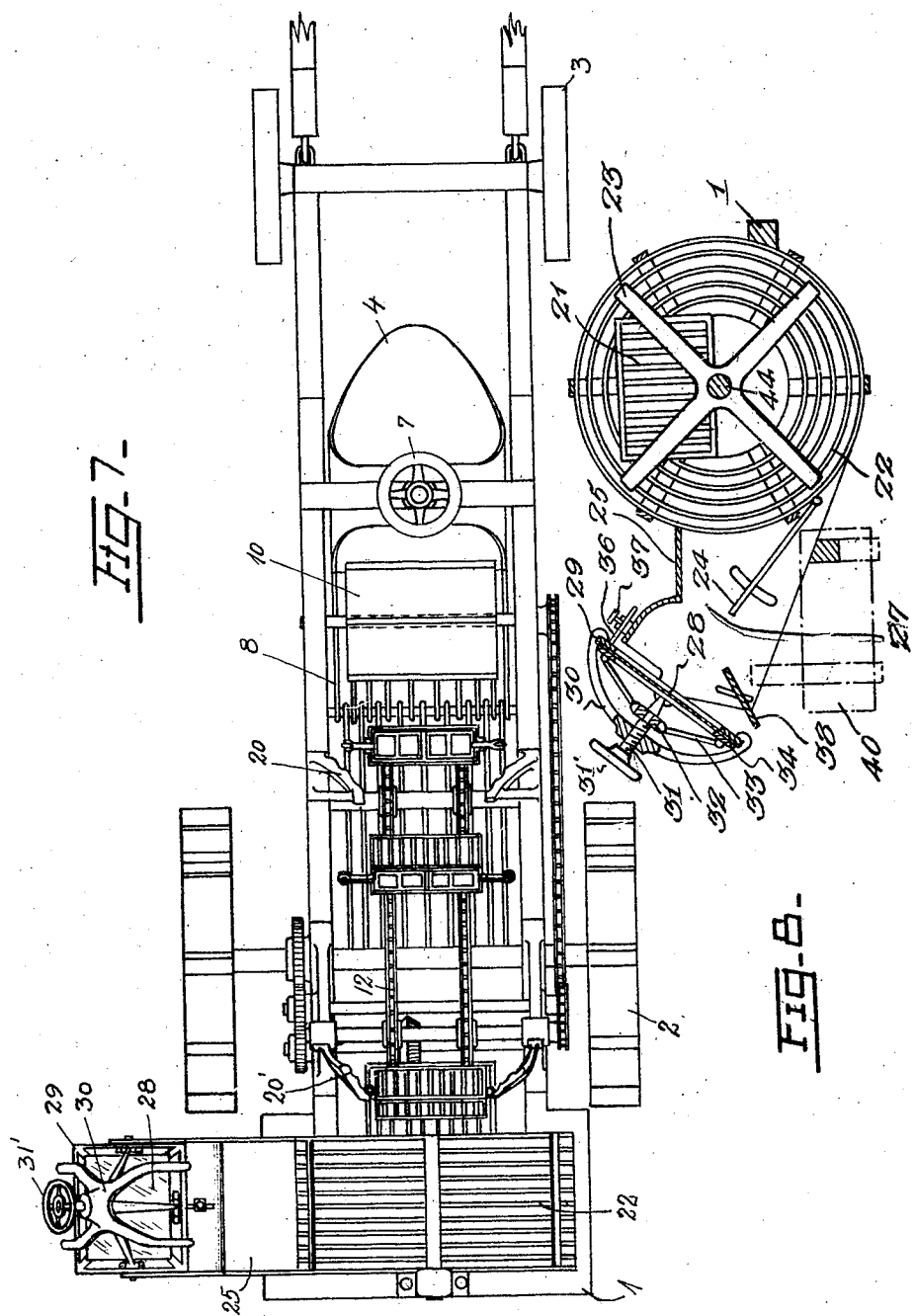

Patented Nov. 20, 1928.

1,692,343

UNITED STATES PATENT OFFICE.

CARL FREDRIK MÖLLER, OF OSLO, NORWAY.

POTATO DIGGER AND SEPARATOR.

Application filed March 11, 1925, Serial No. 14,714, and in Great Britain March 25, 1924.

The present invention relates to machines for digging potatoes of the type having a tine or share adapted to pass under the potatoes in the furrow, grating buckets adapted to receive the potatoes together with earth, tops and stones from the tine and a conveyor arrangement adapted to transport the potatoes and the stones to a sorting mechanism and to free the potatoes from the tops during the travel of the conveyor. The invention resides in the sorting mechanism comprising a resilient surface, means for adjustably stretching the resilient surface, and positive means for throwing the potatoes and stones upward against the resilient surface.

The invention also comprises other details of construction, arrangement and combination of parts all as hereinafter set forth and pointed out in the appended claims.

The invention is shown in the accompanying drawing, in which,

Figure 1 is a side view of a machine embodying my invention.

Figure 2 is a rear end view thereof.

Figure 3 is a front end view of the same.

Figures 4–6 show details of the baskets for transport of the potatoes, of the sorting means, and of the gearing arrangement, respectively.

Figure 7 is a plan view of the machine.

Figure 8 is a cross-sectional view taken through the center of the drum 22 and housing 25.

1 designates the main frame of the machine supporting the entire mechanism on wheels 2 and 3. At the rear of the front wheel 3 is arranged a trough-shaped tine or share 4, the height of which may be regulated in relation to the frame 1 by means of a screwed rod 5 the internally threaded member 6 carried by the frame, and the hand wheel 7. At the rear of the tine 4 a grating is arranged, here shown as two semicircular buckets 8 and 8' the bottoms and sides of which are formed of bars. The foremost bucket 8 is rigidly carried by the tine by means of brackets 9, and thus moves with the tine when the latter is adjusted. In the bucket 8 are rotatable arms 10 fast on a shaft journalled in the brackets 9 and driven by a chain and sprocket wheel connection from the axle 2' of the main wheel 2. The grating bucket 8' is rigidly mounted on the frame 1, and communicates with bucket 8 so that the arms 10 transfer material to be treated from the bucket 8 to the bucket 8'.

A conveyor passes through the bucket 8' and consists of grating baskets 11 secured at intervals to a chain 12 passing over suitable sprockets fast on a shaft 13 and a shaft 13' respectively. The shaft 13 is journalled in bearings mounted directly on the main frame 1, and the shaft 13' is journalled in the top of a bracket 14 arranged on each longitudinal beam of the frame 1. The shaft 13' is driven through chain and sprocket wheel connection from a transverse shaft 15, which carries a gear 15' meshing with a gear keyed to the shaft 2' (Fig. 3). Thus the conveyor is driven at a constant speed relation to the speed with which the machine travels over the potato field.

The conveyor baskets are made up of grate bars 11' and are each provided with a hinged frame or fork like member 16, which form a sort of lid for the baskets. Figure 4 shows the upper portion of a basket and the said lid arrangement in closed position. By means of a spring 17 the lid is normally held against the top of the basket. At one side thereof the lid is provided with an extension 18, the free end of which carries a roller 19. As the baskets 11 are moved through the bucket 8', the said rollers 19 will make contact with brackets 20 arranged on each longitudinal beam of the frame 1 (Figs. 1 and 3). The said brackets 20 are inclined towards the inner portion of the machine and the inner side of each bracket is corrugated, as shown in Fig. 3, and accordingly the lids will be swung open against the action of the springs 17 as the rollers pass along the inclined surfaces of the brackets, and receive at the same time a shaking movement. When the basket is moved so far that the roller 19 leaves the surface of the bracket 20 the spring 17 again causes the lid to close.

At the top of the brackets 14 inclined and corrugated brackets 20' are secured similar to the brackets 20, and acting in a similar manner to swing open the lid of the basket when latter has just passed the top of its travel.

The mechanism thus far described is not claimed as a part of the invention but has been described in order to make clear a means by which the potatoes are dug and freed from the tops and soil adhering thereto and the relation and cooperation of these means with the sorting mechanism comprising the invention and hereinafter described.

When the basket is opened as described above the contents thereof fall into a funnel 21 leading to the lower part of a grating drum 22 suitably mounted transversely on the frame. In this drum a spider 23 rotates, driven from a shaft 44 journalled in suitable bearings mounted on the transverse beams of the frame 1. The said shaft 44 is driven from the main shaft 2' through suitable gearing, best shown at Fig. 6.

The said spider 23 throws the potatoes and the stones coming from the funnel 21 along the lower portion of the drum 22 and out of the same along an inclined plate or surface 24 projecting sideways. The said grate is adjustable as regards its inclination, being pivotally secured at its lower end. The plate 24 is situated within a housing 25 (Fig. 2) extending sideways from the drum 22 and is provided with lugs projecting through slots in the side walls of the housing. Thus the plate may be adjusted as to its inclination and secured in proper position by means of nuts 26 or the like screwed on the said lugs.

The top wall of the housing 25 is so shaped that a restricted opening 27 is formed between the same and the top of the plate 24. Through this opening the potatoes, together with stones but freed from earth and tops, are flung by means of the rotating spider 23, and will then strike against a stretched surface 28 of fabric or the like, forming the end wall of the casing. The said fabric is kept taut by means of the arrangement shown in Fig. 5 and at the left hand portion of Fig. 2.

The said arrangement consists of a frame 29, over two opposite edges of which the ends of a forked arc shaped member 30 engage. Through the central portion of the member 30 a screwed rod 31 passes carrying at the free end thereof a hand wheel 31' and at the other end a boss 32. Pivotally connected to the said boss are four arms 33 the other ends of which are pivotally connected to bars 34. To the said bars are secured in a suitable manner the edges of a piece of fabric or other suitable material, which covers the opening in the frame 29. By turning the hand wheel 31' the fabric may be tightened to the desired degree. The frame 29 is provided with lugs 35 by means of which it is pivotally journalled in the side walls of the housing 25, and has also pivotally connected thereto a rod 36 passing through a lug on the upper part of the housing. Thus the frame may be adjusted as to its inclination, and secured in the desired position by means of a set screw 37 passing through the lug.

In the housing 25 is also situated a baffle plate 38 having screwed lugs passing through slots in the side walls of the housing. Thus the said plate may be tilted to the desired degree and also adjusted as to its position in the slots, and is secured in adjusted position by means of a fly-nut engaging the screwed end of each lug.

It will be understood from the foregoing that the potatoes freed from the soil and tops but mingled with any stones dug up therewith are fed into the drum 22 through funnel 21.

The spider 23 then throws the potatoes through the opening 27 and against the stretched fabric 28. Through the resiliency of the stretched fabric, the potatoes are thrown backwards and fall down through the opening between the plates 24 and 38. The heavy stones, however, fall practically straight downward from the fabric 28 on to the inclined plate 38, slide along the said plate and out of the machine. The potatoes may be collected in a box 40 situated below the housing 25.

Having now particularly described and ascertained the nature of my said invention and in what manner the same is to be performed, I declare that what I claim is:

1. A machine for use in separating and sorting potatoes, stones and other matter in which the sorting mechanism comprises a resilient surface, means for adjustably stretching the resilient surface, and positive means for throwing the potatoes and stones upward against the resilient surface.

2. A machine for use in separating and sorting potatoes, stones and other matter in which the sorting mechanism comprises a piece of fabric, means for adjustably stretching the piece of fabric, and a rotatable spider for throwing the potatoes and stones upward against the surface of the fabric.

3. A machine for use in separating and sorting potatoes, stones and other matter in which the sorting mechanism comprises a housing open at both ends, an upwardly inclined grate in the lower end of the housing, means for throwing the potatoes and stones upward along the inclined grate, and a resilient piece of fabric located at the upper end of the housing and against which the upwardly thrown potatoes and stones impinge.

In testimony whereof I have signed my name to this specification.

CARL FREDRIK MÖLLER.